MEANS FOR DECREASING RADIO DISTURBANCES GENERATED IN A STATIC CONVERTER

Filed April 9, 1963

3,292,072

MEANS FOR DECREASING RADIO DISTURBANCES GENERATED IN A STATIC CONVERTER

Nils Hyltén-Cavallius, Tre Krokars Gata 4A, Karl-Erik Olsson, Kopmangatan 3A, Lennart Faxö, Grottvagen 57, and Svein Jacobsen, Grottvagen 56, all of Ludvika, Sweden Filed Apr. 9, 1963, Ser. No. 271,657
Claims priority, application Sweden, Apr. 10, 1962, 3,944/62; Dec. 21, 1962, 13,837/62
4 Claims. (Cl. 321—9)

Figure 1:
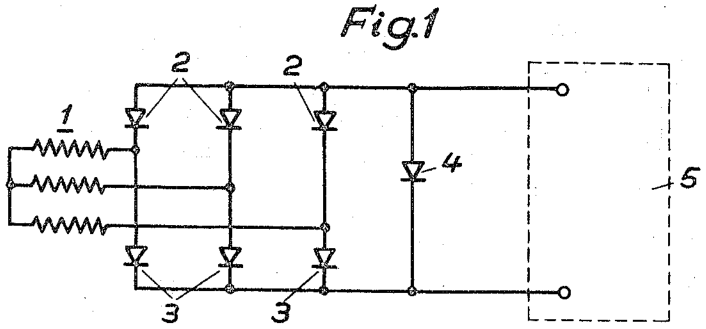

The present invention relates to a means for decreasing radio disturbances which occur in converter plants, e.g. at converter stations for high voltage direct current.

Means for decreasing radio disturbances from electrical machines and apparatus are most often built on the principle of effecting a direct conducting of the disturbance to earth. The disturbing apparatus is then considered as an electromotive power with certain impedance. Over its output terminals is placed another lower impedance, usually a pure capacitor. In this way another and considerably lower level is obtained of that radio disturbance which goes out on the net connected to the apparatus. It is also known to connect inductance coils between the output terminals of the disturbing apparatus and the net connected to this. If the impedance of these inductance coils is sufficiently high inside the frequency range in question, the disturbance which goes out is thereby reduced.

Another known method of reducing radio disturbances is to insert a damping resistance in series with the disturbing apparatus. Such arrangements are for example known in connection with petrol engine ignition systems where a resistance is inserted in the ignition system. At converter plants the disturbing apparatus is the converter. Disturbances are caused by oscillations of radio frequency starting up each time one of the valves ignites. From a radio disturbance point of view it must be imagined that the converter and also the appertaining switchgear contain usually very complicated meshes of capacitances and inductances. The capacitances are to be found in inlets and the like, in the fractions of the line, or have the character of stray capacitances, i.e. capacitances localised to greater plant details. The inductances could be concentrated or distributed, in the last-mentioned case usually appertaining to line fractions with their own and mutual inductances.

The ignition of any of the anodes involves a quick restocking of the loadings which are to be found stored in the capacitances nearest the anode. This restocking will be oscillatory through the influence of above-mentioned inductances but damped by the line resistances of the system, radiation resistances and dielectric losses.

If the system could have been represented by a simple series- or parallel-resonance circuit, a damped oscillation of a single frequency would have been attained. In the case when the disturbing apparatus is a converter plant, and the oscillating system makes complicated meshes, the oscillations will contain a number of frequencies, each of which may be found in each point of the meshes.

The conventional method of decreasing the radio disturbances from such a plant is to screen the main part of the system so that it does not radiate any mentionable power. Outgoing conductors are then provided with earth-connected tapping capacitors or inductance coils in order to reduce the disturbance level on outgoing conductors.

The method with tapping capacitors has however certain disadvantages, since the necessary capacitance readily becomes unreasonably large and the capacitors are thereby bulky and expensive. Under certain circumstances they could also make a collaborating part in an oscillating circuit and thus only help to change the oscillating frequency without thereby substantially lowering the amplitude of the oscillation. Even the procedure with inductance coils connected into outgoing conductors is inconvenient, as the mechanical dimensions of coils with sufficient reactance are so great that the short-circuiting forces can hardly be mastered with economically justifiable constructions. For the same reason difficulties to reach sufficiently good damping properties at high frequencies will arise.

A damping with series resistances is generally not usable, since these would have to conduct the main current and thereby consume too great a power.

The above-mentioned drawbacks are avoided by means of the invention which is based on the principle of suppressing the osciallations inside the converter itself by means of a plurality of reactive damping means arranged inside this.

Each damping means consists of a damping resistive element combined with a reactive element in such a way that the resistive element consumes power only at high frequencies, which as known may be achieved either by connecting a resistor in series with a capacitor between two points in a net, or by inserting a resistance in parallel with an inductive element in a branch of the net. It helps however not to use only one damping means of this kind placed inside the system. A plurality of damping means must be distributed inside the converter so that damping is achieved inside several oscillating circuits in the complicated meshes which the converter must be regarded as consisting of, if it shall be possible to get to the root of the radio-disturbance phenomena.

The invention relates to a means for damping of radio disturbances from converter plants where each converter comprises a transformer and several valves and constitutes a disturbance generating apparatus containing concentrated capacitances and inductances as well as stray capacitances and distributed inductances, in which oscillations are produced by chargings and dischargings of said capacitances occurring at ignition of the valves, said means comprising several damping means, each one consisting of a reactive element and a resistive element connected to this, said damping means being connected inside the apparatus to different oscillating apparatus parts, the mutual connecting of said elements and the connecting of the damping means to conducting parts of the plant having been performed in such a way, known per se, that the resistive elements do not consume any mentionable power through the influence of the normal voltage and current of the plant.

Figure 3:
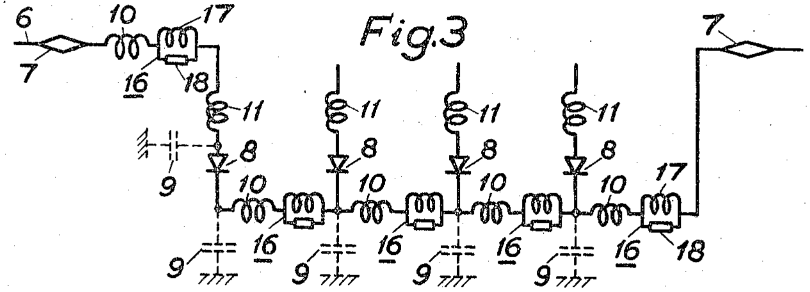
Figure 5:
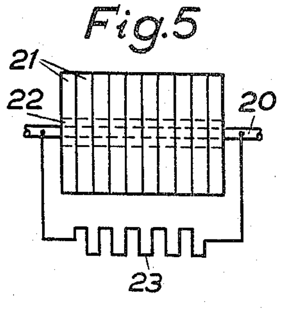
Figure 4:
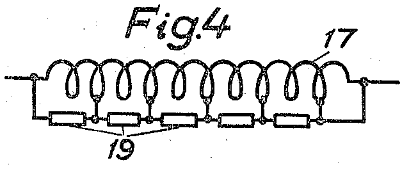

The invention will be described in the following with reference to the accompanying schematical drawing where FIGURE 1 shows a converter, FIGURE 2 the same converter as in FIGURE 1 but with transformer omitted and provided with a means according to the invention, comprising several capacitive damping means. FIGURE 3 shows a detail of the converter in FIGURE 1 provided with inductive damping means and FIGURE 4 shows inductive damping means. FIGURE 5 shows another form of inductive damping means.

In FIGURE 1, 1 indicates a power transformer which together with the working valve groups 2 and 3 and the by-pass valve 4 constitutes a converter. The converted current, e.g. direct current, is led from the converter out to the switchgear 5 which contains a number of switchgear apparatuses not shown on the figure, e.g. inductance coils, auxiliary transformers, inlets, breakers and isolators.

In FIGUR 2, 6 indicates cables from the transformer, which cables via the inlets 7 are led to the working valves 8. A part of the stray capacitance of the system is symbolised on the drawing by the capacitors 9, while the inlets 7 and outlets 12 comprise concentrated capacitances. Some of the line inductances in the converter are represented by the symbol 10, while the concentrated inductances of the converter are represented by the reactors 11 connected to the anodes.

Figure 2:
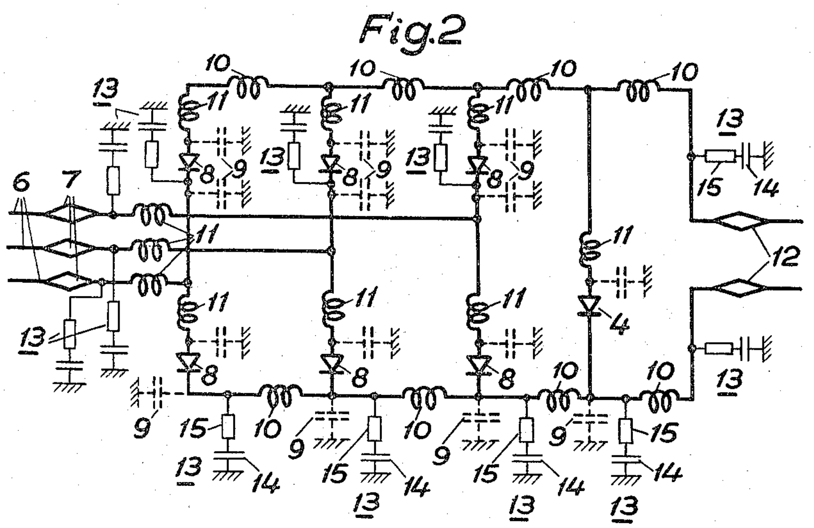

As previously stated, the system shown on FIGURE 2 comprises with regard to radio frequencies meshes containing several connected oscillating circuits. The ignition process sets the whole system in oscillation in such a way that several different frequencies of separate amplitudes occur simultaneously everywhere in the system.

The converter is provided with a means according to the invention comprising capacitive damping means 13 connected between different apparatus parts and earth. Each damping means consists of a capacitor 14 series-connected with a damping resistance 15. The damping means are in the first place connected where the voltage amplitude of the undamped oscillation is high. This has turned out to be the case especially at the cathodes of the valves. It is therefore suitable to provide all or several cathodes each with a damping means, Even on the anodes the voltage amplitude may become high, and these under such circumstances must also be provided each with a damping means. At the inlets, on the other hand, the amplitude may be lower, and damping means placed there would have relatively little effect. In certain circumstances damping means might also be necessary at the inlets, especially if the capacitance of the inlets is not substantially greater than the distributed capacitance of the cathodes to earth.

Alternatively or in complement inductive damping means may be used, which are inserted in net branches in the net composed of the connected converter components, thus constituting a part of the connecting lines. FIGURE 3 shows a part of net shown in FIGURE 1, provided with inductive damping means 16; as in FIGURE 2, 8 indicates the valves, 11 the reactors, 10 conductor inductances and 9 stray capacitances. The inductive damping means are of course connected in the first place in the plant parts where the oscillating current is high. For high voltage converter plants this applies substantially to the conductors from the cathodes and anodes of the valves. Each inductive damping means 16 consists of an inductance coil 17 parallel-connected to a damping resistor 18. The inductance of the inducance coil must be greater than the inductance in that branch of the oscillating net where the damping means is connected.

According to an embodiment of the invention the inductive damping means are made as shown on FIGURE 4, where 17 indicates the reactor coil and 19 series-connected parts of the damping resistance connected across the coil 17, which parts are each parallel-connected to a part of the reactor coil. Investigations have shown that such a division gives an increase of the impedance of the damping means at high frequencies. On the drawing each resistant part 19 is parallel-connected with two runs on the coil 17. Even with a larger number of turns per resistance part a considerable improvement of the impedance characteristic of the damping means is attained. However, it is advantageous to have as few turns as possible per resistance part. How far one can go in this respect is a manufacturing question. From consideration of space and assembly it may be advantageous to distribute the series-connected parts of the damping resistance both axially and peripherally in relation to the coil.

FIGURE 5 shows schematically an embodiment of an inductive damping means where the inductive current transmitting means consists of a conductor 20 surrounded by ferrite discs 21 with central apertures 22. The conductor 20 is connected in parallel with a resistor 23. A considerable damping effect can in many cases be obtained without the parallel-connected resistor 23, as sufficient consumption of power may take place in the magnetic body surrounding the conductor 21 in the form of hysteresis- and eddy current losses.

We claim:

1. A static multi-phase converter for high voltage comprising rectifier means having a plurality of inlet terminals for connection to a multi-phase source and first and second output terminals, said rectifier means including a plurality of pairs of rectifiers having anodes and cathodes, first means connecting each of said inlet terminals to the anode of one rectifier of a pair and to the cathode of another rectifier of a pair, second means connecting the unconnected anodes of the rectifiers to said first outlet, third means connecting the unconnected cathodes of each pair to the second outlet, said third connecting means including elements connecting one unconnected cathode to another and connecting the cathodes to said second outlet, and a plurality of damping means each connected between a different one of said elements at a point adjacent one of the cathodes connected to said element and earth, each damping means comprising a resistive component and a capacitor connected in series.

2. In a converter as claimed in claim 1, each element having inductive reactance.

3. A static multi-phase converter for high voltage comprising rectifier means having a plurality of inlet terminals for connection to a multi-phase source and first and second output terminals, said rectifier means including a plurality of pairs of rectifiers having anodes and cathodes, first means connecting each of said inlet terminals to the anode of one rectifier of a pair and to the cathode of another rectifier of a pair, second means connecting the unconnected anodes of the rectifiers to said first outlet, third means connecting the unconnected cathodes of each pair to the second outlet, said third connecting means including elements connecting one unconnected cathode to another and connecting the cathodes to said second outlet, at least a substantial number of such elements each including a resistive component and an inductive component connected in parallel.

4. In a converter as claimed in claim 3, said components comprising a resistor connected in parallel with an inductance coil, said resistor and said coil consisting of a plurality of series- connected parts, each part of said resistor being connected in parallel with a corresponding part of said inductance coil.

References Cited by the Examiner

UNITED STATES PATENTS 1,998,325 4/1935 Lyman ............... 321—10

FOREIGN PATENTS 227,714 9/1943 Switzerland.

OTHER REFERENCES

"Special Stabilized Power Supplies," by B. T. M. Neale, pub. in Marconi Review (1st Quarter 1962), pp. 81 and 82.

JOHN F. COUCH, *Primary Examiner.*

LLOYD McCOLLUM, *Examiner.*

W. H. BEHA, *Assistant Examiner.*